United States Patent [19]

Elwell

[11] Patent Number: 4,981,277
[45] Date of Patent: Jan. 1, 1991

[54] CUP HOLDER
[75] Inventor: John R. Elwell, Dearborn, Mich.
[73] Assignee: Chrysler Corporation, Highland Park, Mich.
[21] Appl. No.: 491,773
[22] Filed: Mar. 12, 1990
[51] Int. Cl.[5] ............................................... A47K 1/08
[52] U.S. Cl. .............................. 248/311.2; 224/42.42; 224/281
[58] Field of Search ............... 248/311.2, 309.1, 316.4; 224/281, 42.42; 297/194; 220/85 H

[56] References Cited

U.S. PATENT DOCUMENTS

| 4,040,659 | 8/1977 | Arnold | 297/194 |
|---|---|---|---|
| 4,286,742 | 9/1981 | Pellegrino | 224/281 |
| 4,511,072 | 4/1985 | Owens | 224/273 |
| 4,645,157 | 2/1987 | Parker | 248/311.2 |
| 4,733,908 | 3/1988 | Dykstra et al. | 297/194 |
| 4,756,572 | 7/1988 | Dykstra et al. | 297/194 |
| 4,759,584 | 7/1988 | Dykstra et al. | 297/194 |
| 4,783,037 | 11/1988 | Flowerday | 248/311.2 |
| 4,828,211 | 5/1989 | McConnell et al. | 248/311.2 |
| 4,892,281 | 1/1990 | DiFilippo et al. | 248/311.2 |
| 4,907,775 | 3/1990 | Lorence et al. | 248/311.2 |

Primary Examiner—Ramon O. Ramirez
Attorney, Agent, or Firm—Edward A. Craig

[57] ABSTRACT

A dual beverage container holder for a vehicle. The vehicle includes a housing formed in the dashboard of the vehicle which has an opening facing the interior of the vehicle. The housing includes a central support member. An insert member includes a receiver member which is slideably journaled to the central support member. The insert member includes a base and an upper wall which are connected by the receiver member. The upper wall includes a pair of arcuate surfaces which face outward from the central receiver member. The lower wall supports at least a portion of the base of a beverage container. A pair of pivotal arms are connected to the insert and are biased for pivoting away from the receiver portion in response to sliding of the insert out of the housing. Each pivotal arm includes a free end having an arcuate surface facing toward the receiver portion for engaging the outside surface of a beverage container between the arcuate surface of the upper wall and the arcuate surface of the pivotal arm.

9 Claims, 3 Drawing Sheets

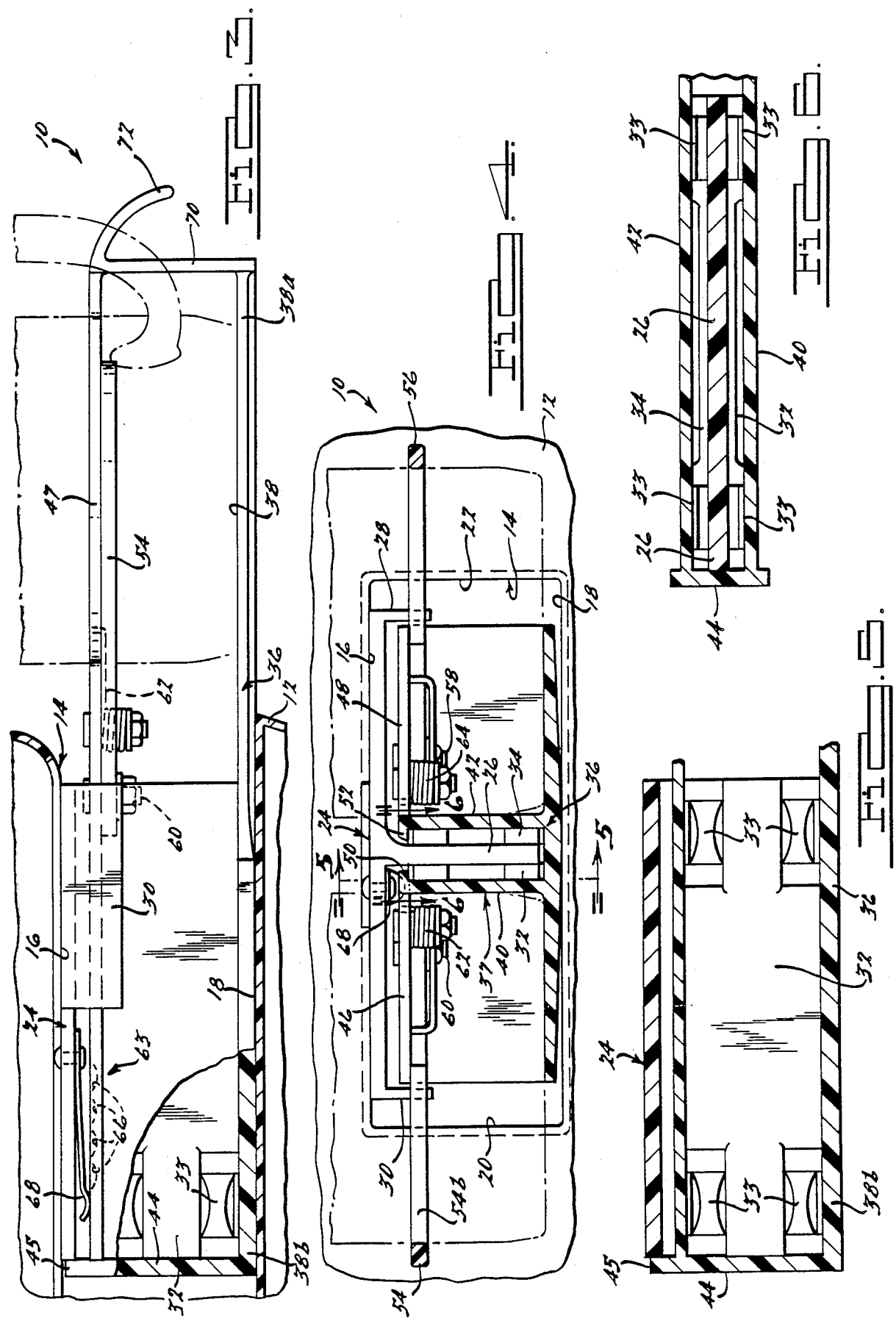

CUP HOLDER

BACKGROUND OF THE INVENTION

1. Field of the Invention

The present invention relates to a beverage container holder for a vehicle. More particularly, the present invention relates to a retractable space saving beverage container holder for extension and retraction from a dash board of a vehicle.

2. Description of Related Art

In the past it has been desirable to provide a construction for beverage container holders in vehicles. Several constructions have been provided including those using the door to the glove box or utilizing various storage compartments for providing a suitable location for holding beverages in the interior of the vehicle.

In the past it has also been desirable to provide a beverage container holder which would conserve space yet would allow the holding of two beverage containers at a time since it is often necessary to provide the holding of two containers at the same time when traveling in a vehicle. In addition, it has been desirable in the art to provide a beverage container holder which will hold securely various different sizes of beverage containers such as cans, bottles or coffee cups and the like and is readily adapted thereto. Examples of various container holders for vehicles are shown in U.S. Pat. No. 4,828,211 to McConnell; U.S. Pat. No. 4,783,037 to Flowerday; U.S. Pat. No. 4,759,584 to Dykstra et al.; U.S. Pat. No. 4,756,572 to Dykstra et al.; U.S. Pat. No. 4,733,908 to Dykstra et al.; U.S. Pat. No. 4,645,157 to Parker; U.S. Pat. No. 4,511,072 to Owens; U.S. Pat. No. 4,286,742 to Pellegrino; and U.S. Pat. No. 4,040,659 to Arnold. While these cup holder constructions have been improvements in the art there remains a need in the art for an improved dual cup holder device which is retractable into a dash board orifice.

SUMMARY OF THE INVENTION

In accordance with the present invention there is provided a dual beverage container holder assembly for a vehicle which includes a housing formed in the dash board of the vehicle with an opening facing the interior of the vehicle. The housing includes a central support member. An insert member is slideably disposed in the housing. The insert member includes a base and an upper wall connected by a longitudinally extending central receiver member which is slideably journaled to the central support member. The upper wall includes a pair of arcuate surfaces which face outward from the central receiver member for forming a pair of openings for engaging the arcuate side surface of a beverage container on each side of the receiver portion. The lower wall supports at least a portion of the base of the beverage container. A pair of pivotal arms are connected to the insert, and are biased for pivoting away from the receiver portion in response to sliding of the insert out of the housing. Each pivotal arm includes a free end having an arcuate surface facing toward the receiver portion for engaging the outside surface of a beverage container and retaining the beverage container between the arcuate surface of the upper wall and the arcuate surface of the pivotal arm.

Other features and advantages of the present invention will be readily appreciated as same becomes better understood in light of the following description taken in connection with the accompanying drawings.

BRIEF DESCRIPTION OF THE DRAWINGS

FIG. 3 is a side view of the assembly of the present invention in the direction of arrow 3, partially broken away, showing the beverage container holder of the present invention;

FIG. 4 is a sectional view taken along line 4—4 of FIG. 2;

FIG. 5 is a sectional view partially broken away taken along line 5—5 of FIG. 4; and FIG. 6 is a sectional view taken along line 6—6 of FIG. 4.

DETAILED DESCRIPTION OF THE PREFERRED EMBODIMENT

Figure 1:
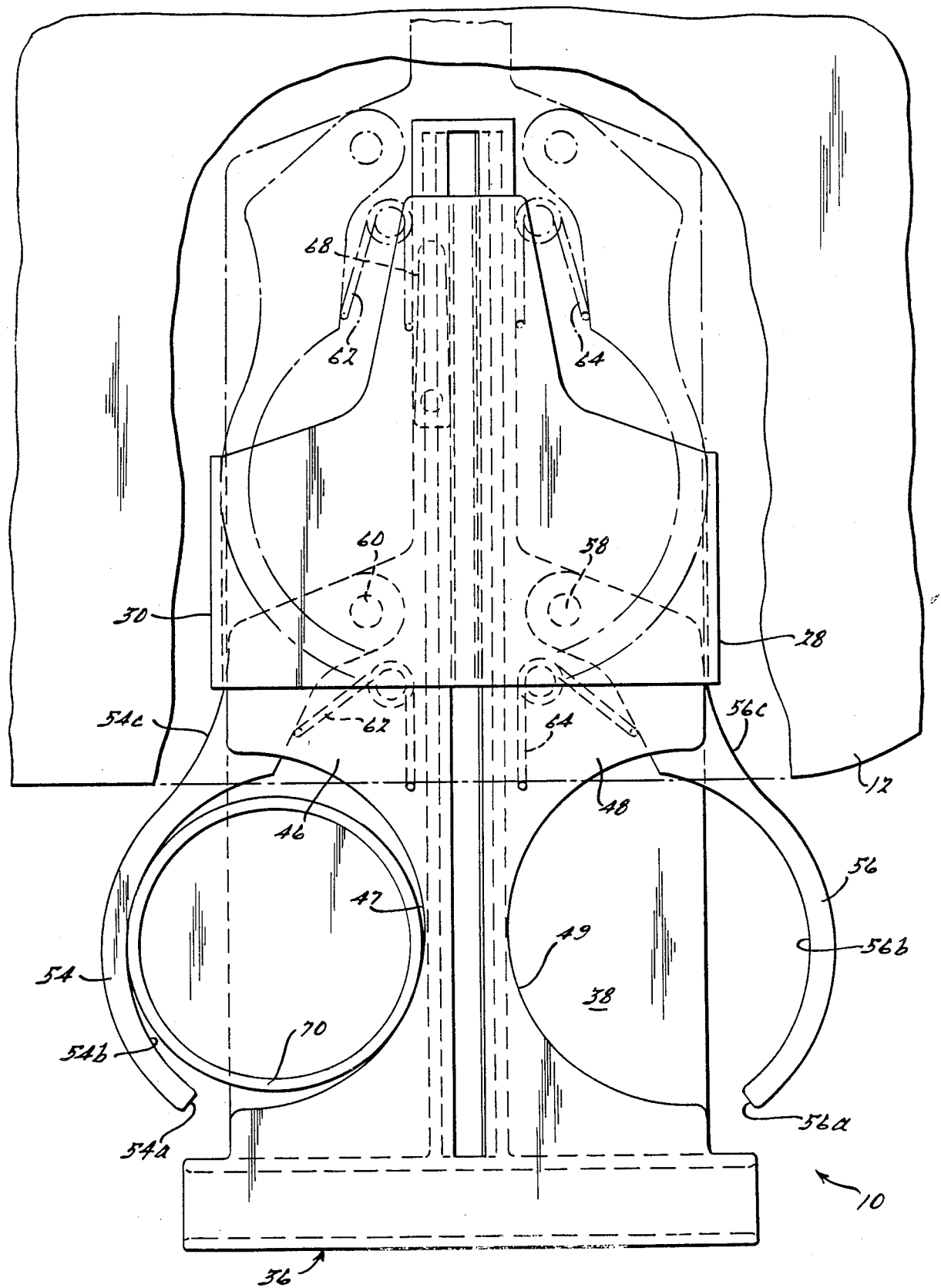
FIG. 1 is a top view of a dash board partially broken away which shows the beverage container holder assembly of the present invention in the stored position in phantom and in the extended position as utilized in the dash board of a vehicle.

Referring now to the figures, in accordance with the present invention there is provided a dual cup holder 10 which is retractable into a vehicle dash board 12. The dash board 12 includes an opening 14 therein as best seen in FIGS. 3 and 4. The opening 14 includes a top 16, a bottom 18 and sides 20 and 22. The dash board opening 14 opens into the interior of the dash board 12.

Referring now to FIG. 4, a mounting bracket 24 is attached in the opening 14 adjacent the top 16 thereof. The mounting bracket 24 includes a central support member 26 which extends in a direction away from the top at the central location. The mounting bracket 24 is of a T-shape and includes camming flanges 28 and 30 which extend in a direction away from the top of the opening and adjacent the sides 22 and 20 of the opening. The central support member 26 includes a pair of tension spring members 32 and 34 which have frictional engagement members 33 attached thereto. The frictional engagement members are bowed outward in unstressed conditions such that they tensionally engage walls 40 and 42 as best seen in FIG. 6.

A cup holder insert 36 is provided. Cup holder insert 36 includes a base portion 38 which includes a front 38a and a rear portion 38b. An upstanding receiver portion 37 is formed by a pair of parallel upstanding walls 40 and 42 which are integrally attached to a rear upstanding wall 44. The walls 40 and 42 form a channel therebetween for sliding along the members 32 and 34 of the central support member 26. The tang portion 45 acts as a stop to stop progression of the insert beyond the fully extended position by interfering with the mounting bracket 24 as best seen in FIGS. 5 and 6. The wall 44 also abuts against support member 26 to provide a stop in conjunction with tang 45. The frictional engagement members 33 are stressed against walls 40 and 42 for providing tension during relative sliding between the insert 36 and the mounting bracket 24. This also acts to generally tighten the slideable connection to reduce rattling and the like.

A pair of attachment flanges 46 and 48 are provided at the rear portion 38b and spaced from the base 38. The attachment flanges include overextending edges 50 and 52 which secure the receiver portion 37 slideably onto the central support member 26.

A pair of pivotal arms 54 and 56 are pivotally journaled to attachment flanges 48 and 46 about the bolts 58 and 60. The pivotal arms 54 and 56 include free ends 54a and 56a, arcuate container engagement portions 54b and 56b and ramped camming surfaces 54c and 56c. A pair of biasing springs 62 and 64 are provided for biasing the arms towards outward movement from the central support member. The ramped camming surfaces 54c and 56c are preferably somewhat arcuate and engage the respective camming flanges 28 and 30 during relative movement between the insert 36 and the mounting structure 24. A variable stop means generally indicated at 63 is provided for providing a variety of positions during relative sliding between the insert and the mounting structure. The variable stop means 63 includes a spring member 68 which is attached to the mounting bracket 24 such that it engages indentations 66 which are provided in the attachment flange 46.

The arcuate camming surface, the portion 56b of engagement arm 56 and the variable stop means are positioned to cooperate with one another such that each progressive increment provided by the indentations provides a progressively larger opening for receiving a container.

Outer end wall 70 includes a handle 72 which allows the vehicle operator to actuate the beverage container holder into and out of the opening 14 in the dashboard 12.

Figure 2:
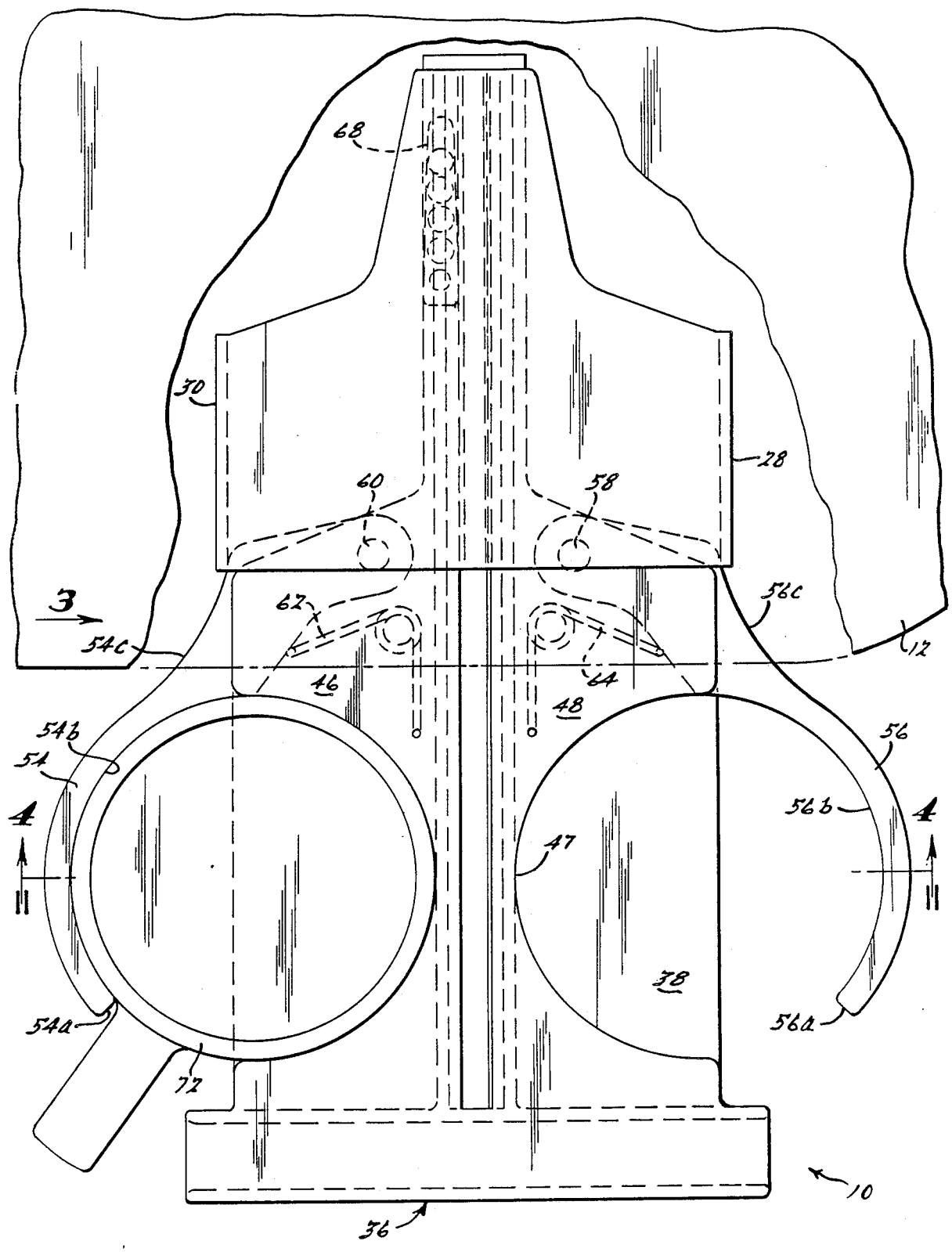
FIG. 2 is a top view of a dash board partially broken away showing the beverage container holder apparatus of the present invention in a fully extended position wherein a large diameter cup with a handle is held in the beverage container holder.

Thus, in operation the insert 36 moves relative to the mounting bracket 24 which is fixed in the opening 14. Upon inward sliding movement between the insert 36 and mounting bracket 24, pivotal arms 54 and 56 will move inward for storage as best seen in FIG. 1 with the arms 56 and 54 in phantom. Progressively sliding the insert 36 outward provides for progressively larger openings between the arcuate engagement surfaces 47 and 49 of the attachment flange and the arcuate surface 54b and 56b of the arms 54 and 56. Thus, as shown in FIG. 1, the arms can be adjusted to engage a relatively narrow can type container 70 or the insert can be slid outward from the mounting base farther in order to engage a wider beverage container such as cup 72 as best seen in FIG. 2. Thus, in the present invention, a dual cup holder is provided which retracts into a small space due to the pivotal arms 54 and 56 retracting to a point less than the width of the opening 14 in the dash board 12. Thus, a convenient and practical beverage container holder is provided in the present invention which can securely hold a number of widths of beverage containers.

The invention has been described in an illustrative manner and it is to be understood that the terminology which has been used is intended to be descriptive rather than limitative. Obviously, many modifications and variations of the invention are possible in light of the above teachings. Therefore, it is to be understood that within the scope of the appended claims the invention may be practiced otherwise than as specifically described.

I claim:

1. A retractable beverage container holder for a vehicle comprising:

a housing in the dashboard of the vehicle, said housing including surfaces defining an opening facing the interior of the vehicle;

a cup holder insert, said cup holder insert including a base portion for support of a beverage container and a fixed upstanding support member, said upstanding support member including a first arcuate surface adapted for partially surrounding a container;

a means to provide sliding movement between said housing and said cup holder insert;

a pivotal arm vertically spaced from said base portion and pivotally journaled to the support member, said pivotal arm including an arcuate cam surface for engaging the housing and a second arcuate surface adjacent a free end of said arm facing the first arcuate surface of said upstanding support member for partially surrounding a beverage container positioned between said first and second arcuate surfaces, said pivotal arm being biased toward opening outward from said support member and beyond the limits of said housing, said pivotal arm opening outwardly when said insert is retracted from the housing and said arm is moved inward when said insert is slideably replaced in said housing and a multiple position stop means comprising a spring member attached to one of said insert and said housing for cooperating with a series of indentations in the other of said insert and said housing for providing stops at variable size openings between said first and said second arcuate surfaces during sliding between said insert and said housing.

2. A dual beverage container holder assembly for a vehicle comprising:

a housing member formed in the dashboard of a vehicle and including surfaces defining an opening facing the interior of the vehicle, said housing member including a means for slideably receiving an insert member;

an insert member slideably disposed in the housing, the insert member including a base and an upper wall connected by a longitudinally extending central receiver member, said upper wall including a pair of arcuate surfaces facing outward from said central receiver member for forming a pair of openings for partially surrounding an arcuate side surface of a beverage container on either side of said central receiver member, said lower wall supporting at least a portion of the beverage container;

a pair of pivotal arms connected to said insert and biased for pivoting away from the central receiver member in response to sliding of said insert member out of said housing, said pivotal arm including a free end having an arcuate surface facing toward the central receiver member portion for partially surrounding the outside surface of a beverage container and retaining the beverage container between said arcuate surfaces of the upper wall and the arcuate surface of the pivotal arm; and a stop means for providing a stop position at an open position of said pivotal arms for holding of said insert member at an open position.

3. The dual beverage container holder assembly of claim 2 wherein said stop means further comprises a spring member attached to one of said housing member and said insert member and the other of said housing and insert members including an indentation, said spring member including a tongue portion for engaging the indentation when said insert is in said open position thereby releasably holding said insert in said open position.

4. The dual beverage container holder of claim 2 wherein said insert member includes a pair of downwardly extending camming flanges on either side thereof, each of said pair of pivotal arms including a cooperating camming surface for moveably engagable with said camming flanges during sliding therebetween thereby providing opening of said arms during outward sliding and closing of said arms during sliding of the insert in an inward direction.

5. The dual beverage container holder of claim 4 wherein said cooperating camming surfaces are arcuate surfaces.

6. A dashboard and retractable dual beverage container holder comprising:
 a dashboard for a vehicle including an opening therein for receiving a retractable dual beverage container holder, said opening including a top, a bottom and two sides;
 a mounting bracket attached in said opening, adjacent said top of said opening, said mounting bracket including a central support member extending in a direction away from said top at a central location and a pair of camming flanges extending in a direction away from said top of said opening and adjacent said two sides of said opening;
 a cup holder insert, said cup holder insert including a base having a front and a rear portion and an upstanding receiver portion, said receiver portion being slideably journaled to said central support member for facilitating sliding of said insert into and out of said opening, said upstanding receiver portion including a pair of attachment flanges spaced from the base and at the rear portion of said cup holder insert;
 a pair of pivotal engagement arms pivotally journaled to said pair of attachment flanges, each of said pivotal arms biased toward movement away from said receiver portion including a free end defining an arcuate beverage container engaging portion and a camming surface, said camming surface engaging said camming flanges during relative movement between said insert and said mounting bracket for providing opening and closing of said pivotal arms in response to sliding movement therebetween;
 a variable stop means for providing selective stop positions of said pivotal arms for engaging variable size beverage containers, said pivotal arms being collapsible for sliding into said opening; and
 an upstanding closure wall at the front of said insert for substantially closing the opening when said insert is retracted fully into said opening.

7. The dashboard and retractable dual beverage container holder of claim 6 wherein said variable stop means further comprises a spring member attached to one of said housing member or said insert member and the other of said members including an indentation, said spring member including a tongue portion for engaging the indentation when said insert is in said open position.

8. The dashboard and retractable dual beverage container holder of claim 6 wherein said camming surfaces of said pivotal arms is arcuate.

9. A dashboard and retractable dual beverage container holder comprising:
 a vehicle dashboard having an opening therein, said opening including a top, a bottom and two sides;
 a mounting bracket attached to the dashboard adjacent said top of said opening; said mounting bracket having a first portion extending along said top of said opening and having a pair of side edges terminating adjacent said sides of said opening, said mounting bracket including a pair of side camming flanges extending downwardly from each of said side edges of said opening, said mounting bracket including a downwardly extending centrally disposed support member extending along the length of said first portion, said support member having a pair of tensioning spring members attached on either side thereof, each of said pair of tensioning spring members including a terminal upper surface;
 a beverage container holder insert including a base extending parallel with said first portion of the mounting member for supporting a bottom of a beverage container; an upstanding receiver portion extending longitudinally from and along a centerline of said base, said receiver portion having a central channel therein for receiving said support member and said spring tensioning members, said receiver member including a pair of lips for extending over said terminal upper surfaces of said pair of spring tensioning members, said receiver portion being slideable with respect to said support member and said tensioning members providing for frictional engagement with said receiver portion to reduce rattling between said receiver portion and said support member, said receiver member including a rear wall for closing of said channel in said receiver portion to provide a stop against sliding of said insert beyond a predetermined point; an upper attachment flange member vertically spaced from and parallel to said base member, attached to and extending along said receiver member, said upper attachment flange including a pair of outwardly extending beverage container receiving portions, said pair of beverage container receiver portions each including an arcuate concave container receiving surface formed therein, a pivotal arm attached to said upper attachment flange on either side of said receiver portion, a helical spring operably attached between said attachment flange and each pivotal arm for biasing said pivotal arm towards movement away from said receiving member, each of said pivotal arms including a concave arcuate camming surface for cooperating with said camming flanges of said mounting bracket for progressively allowing for movement away from or toward said central receiving member during relative sliding movement between said beverage container holder insert and said mounting bracket; each of said pivotal arms including an arcuate free end having an arcuate concave surface facing each of said container receiving surfaces of said container receiving portions of said attachment flange for supporting of sides of a beverage container between said arcuate concave surface of said pivotal arm and said arcuate container receiving surface of said container receiving portions; a spring member attached to said mounting bracket, said spring member including a tongue portion for tensionally engaging the attachment flange portion during sliding therebetween, said attachment flange portion including a plurality of longitudinally spaced indentations for cooperating with said tongue portion to provide for stopping points during sliding between said beverage container holder insert and said mounting bracket to provide stopping points for pivoting of the pivotal arms for providing for different progressive size openings between said arcuate concave surface of said pivotal arms and said container receiving surfaces of said container receiving portion for closely surrounding the sides of various sizes of beverage containers.

* * * * *